United States Patent
Kloepper et al.

(10) Patent No.: US 9,266,786 B2
(45) Date of Patent: Feb. 23, 2016

(54) METHOD OF REDUCING NITROUS OXIDE EMISSIONS FROM A PLANT GROWTH SUBSTRATE

(71) Applicants: The United States of America, as Represented by the Secretary of Agriculture, Washington, DC (US); Auburn University, Auburn, AL (US); Tenfold Technologies, LLC, Pilot Point, TX (US)

(72) Inventors: Joseph W Kloepper, Auburn, AL (US); Pamela Calvo Velez, Auburn, AL (US); Henry Allen Torbert, III, Opelika, AL (US); Dexter B Watts, Tallassee, AL (US); Robert Norman Ames, Pilot Point, TX (US)

(73) Assignees: The United States of America, as represented by The Secretary of Agriculture, Washington, DC (US); Auburn University, Pelham, NY (US); Tenfold Technologies LLC, Pelham, NY (US)

( * ) Notice: Subject to any disclaimer, the term of this patent is extended or adjusted under 35 U.S.C. 154(b) by 0 days.

(21) Appl. No.: 13/843,526

(22) Filed: Mar. 15, 2013

(65) Prior Publication Data
US 2013/0205849 A1     Aug. 15, 2013

Related U.S. Application Data

(63) Continuation-in-part of application No. PCT/US2012/060463, filed on Oct. 16, 2012.

(60) Provisional application No. 61/627,833, filed on Oct. 17, 2011.

(51) Int. Cl.
| | |
|---|---|
| C05C 5/00 | (2006.01) |
| C05C 9/00 | (2006.01) |
| C05F 11/08 | (2006.01) |
| C05G 3/00 | (2006.01) |
| A01G 9/10 | (2006.01) |
| A01G 31/00 | (2006.01) |

(52) U.S. Cl.
CPC ............... *C05G 3/00* (2013.01); *A01G 9/1086* (2013.01); *A01G 31/001* (2013.01); *C05C 5/00* (2013.01); *C05C 9/00* (2013.01); *C05F 11/08* (2013.01); *Y02P 60/216* (2015.11)

(58) Field of Classification Search
None
See application file for complete search history.

(56) References Cited

U.S. PATENT DOCUMENTS

| | | | | |
|---|---|---|---|---|
| 6,232,270 | B1* | 5/2001 | Branly et al. | 504/117 |
| 6,471,741 | B1* | 10/2002 | Reinbergen | 71/6 |
| 2005/0235717 | A1* | 10/2005 | Porubcan | 71/6 |
| 2007/0131009 | A1* | 6/2007 | Westbrook et al. | 71/6 |
| 2009/0308121 | A1* | 12/2009 | Reddy et al. | 71/6 |
| 2013/0091912 | A1* | 4/2013 | Puah et al. | 71/9 |
| 2013/0255338 | A1* | 10/2013 | Lopez-Cervantes et al. | 71/7 |

FOREIGN PATENT DOCUMENTS

WO     2013/056084     *     4/2013

* cited by examiner

*Primary Examiner* — Wayne Langel
(74) *Attorney, Agent, or Firm* — John D. Fado; Mark D. McNemar

(57) ABSTRACT

A method of modulating and in particular, reducing nitrous oxide emission from a substrate for growing on or more plants by applying a microbial based soil additive and a fertilizer blend to the substrate.

10 Claims, 3 Drawing Sheets

METHOD OF REDUCING NITROUS OXIDE EMISSIONS FROM A PLANT GROWTH SUBSTRATE

CROSS REFERENCE TO RELATED APPLICATION

This application is a continuation in part application of PCT appln. no. PCT/US2012/060463, filed Oct. 16, 2012, which claims the benefit under 35 U.S.C. 119 (e) of U.S. Provisional Application No. 61/627,833 Filed Oct. 17, 2011. The contents of these applications are hereby incorporated by reference into the present disclosure.

REFERENCE TO GOVERNMENT GRANT

This invention was supported in part by funds obtained from the U.S. Government The U.S. Government may have certain rights in the invention.

TECHNICAL FIELD

Provided herein is a method for the reduction of greenhouse gases in plant cultivation. In particular, provided is a method for reducing nitrous oxide emissions from a plant growth substrate by applying a microbial composition and a fertilizer composition to said plant growth substrate.

BACKGROUND

Recent concerns about increased accumulations of greenhouse gases in the atmosphere have stimulated interest in developing better crop management practices to decrease $N_2O$ emissions from agricultural soils. Agriculture is the single largest source of anthropogenic $N_2O$ emissions (Bouwman et al., 2005). Currently, agricultural $N_2O$ emissions are more than twice that of pre-1940 management practices and about six times more than from native vegetation (Del Grosso et al., 2005). Nitrogen fertilization is considered the major source of agricultural $N_2O$ emissions, contributing 60 to 80% of total emissions on a global scale (Dalal et al., 2003; FAO, 2008). To meet growing demands for food, however, N fertilization is needed to optimize crop yields. Thus, considerable effort is being spent extensively studying fertilization practices to reduce $N_2O$ emissions.

Estimations of $N_2O$ emissions from N fertilizers applied to agricultural crops vary widely because $N_2O$ fluxes depend on many factors, such as the type of N fertilizer and the amount of N applied (Eichner, 1990). For instance, losses of $N_2O$ are greater with $NH_4NO_3$ than with urea (Harrison and Webb, 2001). Also, $N_2O$ emission rates are 0.04% for $NO_3$, 0.15 to 0.19% for $NH_4$ and urea, and 5% for anhydrous $NH_3$ (Breitenbeck et al., 1980; Slemr and Seiler, 1984). The concentrations of $NH_4$ and $NO_3$ in the soil, however, have a greater effect on $N_2O$ emissions than the specific fertilizer type applied (Harrison and Webb, 2001).

Microbial interactions in the soil are a very important aspect of $N_2O$ emissions from agricultural soils. Native soil microorganisms are responsible for the degradation and conversion of different forms of N in the soil. The most important chemical reactions that take place in the N cycle are mineralization, immobilization, nitrification, denitrification, $N_2$ fixation, and volatilization. These chemical reactions are largely affected by environmental conditions such as temperature and soil moisture. Because environmental conditions are constantly changing, the interactions among all the chemical reactions are very dynamic. Harrison and Webb (2001) suggested that denitrification is the main process responsible for $N_2O$ emissions under anaerobic soil conditions, while nitrification accounts for emissions under aerobic soil conditions.

Due to the great importance of the soil microbial community in N cycling in the soil, alterations in community composition and abundance can change the rate of N cycle processes (Cavigelli and Robertson, 2000). Hence, manipulating native soil microbial communities by chemical treatments or by inoculation with selected microorganisms can potentially alter N cycling in the soil. For example, adding nitrification inhibitors is a widely used method to reduce the rate of nitrification by inhibiting autotrophic $NH_3$-oxidizing bacteria (Singh and Verma, 2007).

During the past few decades, there has been increased interest in the use of beneficial microbial inoculations to improve plant and soil functions. Several microorganisms, such as plant growth-promoting rhizobacteria (PGPR), have been widely studied (Figueiredo et al., 2010). The PGPR stimulate plant growth through either a "biofertilizing" effect or a biocontrol effect. There is currently much interest in PGPR and other microbial-based inoculants specifically as alternatives to or supplements with fertilizers to improve the uptake of nutrients (Adesemoye et al., 2009, 2010; Canbolat et al., 2006; Idriss et al., 2002). Among the PGPR microorganisms, *Bacillus* spp. are widely used, mainly because they can survive as spores and can potentially alter the soil microbial composition. *Bacillus* spp. have a wide metabolic capability that allows them to play important roles in soil ecosystem functions and processes. Due to their heterotrophic nature, *Bacillus* spp. play an important role in the soil C cycle, soil N cycle, soil S cycle, and transformation of other soil nutrients (Mandic-Mulec and Prosser, 2011). Furthermore, they work as biocontrol agents due to the wide range of antiviral, antibacterial, and antifungal compounds they produce, which can control pathogens and have an effect on other soil microorganisms (Chaabouni et al., 2012). Antibiotics are important metabolites that are produced by *Bacillus* spp. They not only can control pathogens but also confer a competitive advantage over other soil microorganisms (Stein, 2005).

Although the use of microbial-based inoculants is increasing, currently there is a lack of information about how these products affect $N_2O$ emissions from soils when N fertilizers are present.

SUMMARY OF THE DISCLOSURE

Provided herein is a method for modulating nitrous oxide emission from a substrate for growing one or more plants treated with a fertilizer blend comprising ammonium nitrate comprising applying to said substrate a Trichoderma-free microbial based soil additive comprising a mixture of at least four microbial strains or filtrate, supernatant or extract of said mixture in an amount effective to modulate said nitrous oxide emission. The substrate may include but is not limited to soil, vermiculite, pearlite, gravel, clay, sand, peat moss, ground up wood, pine bark or any other medium typically used to support growing plants treated with fertilizers.

In one embodiment, the microbial based soil additive comprises *Acidovoras facilis, Bacilluslicheniformis, Bacillus subtilis, Bacillus oleronius, Bacillus marinus, Bacillus megaterium, Rhodococcus rhodochrous*, has a pH between about 8.0 to about 8.5, , and contains Nitrate-N, Boron, Phosphorus, Potassium, Calcium, Magnesium, Zinc, Copper, Iron, Manganese, Sodium or filter sterilized broth thereof.

In another particular embodiment the microbial based soil additive and/or amendment is set forth in PCT/US 2012/060010. This microbial product contains microbes and microbially-produced metabolites. In a particular embodiment, the soil additive and/or amendment has the following characteristics: (a) has a pH of about 7.5 to 8; (b) COD range less than about150 mg/L; (c) Conductivity range of about 600 uS to 1400 uS; (d) Color clear amber between about 500 pt/co units to about 700 pt/co units in a platinum to cobalt (pt/co) scale; (e) comprises *Syntrophus, Desulfovibrio, Symbiobacteria, Georgfuschia, Thauera, Nitrosomonas, Bellilinea, Sulfuritalea*, and *Owenweeksia*; (f) has a biomass greater than $10^7$ microbes per ml.; (g) contains between about 10-60 ng/ml DNA or filter sterilized broth thereof.

In yet another particular embodiment, the microbial based soil additive is derived from SoilBuilder™ (SB) products sold by (AGRICEN, Pilot Point, Tex.) and include concentrated SoilBuilder™-AF and unconcentrated forms of Soil-Builder™ (hereinafter referred to collectively as "Soil-Builder™") and even more particularly from a filter-sterilized broth or metabolite extract of SoilBuilder™ (AGRICEN, Pilot Point, Tex.) (SBF).

In yet another embodiment, the microbial based soil additive is a mixture of spore-forming plant-growth promoting rhizobacteria comprising at least four microbial strains. In a particular embodiment, one of the four microbial strains is a *Bacillus* strain. In another embodiment, the microbial based soil additive comprises at least three *Bacillus* strains.

In one embodiment, the fertilizer blend comprises calcium ammonium nitrate. In another embodiment, the fertilizer composition comprises urea ammonium nitrate.

DETAILED DESCRIPTION

Figure 1:
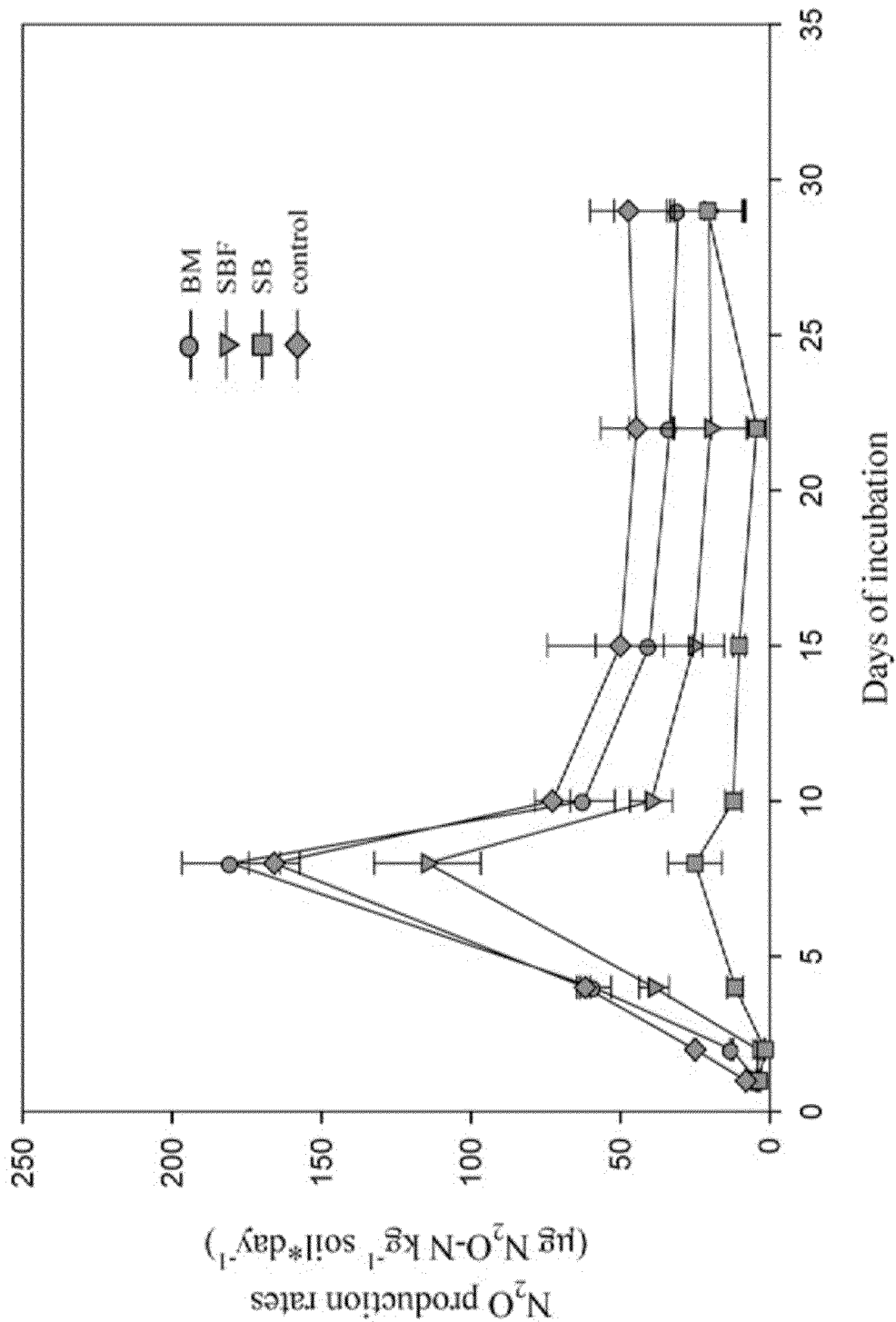
FIG. 1. Temporal changes in $N_2O$ and $CO_2$ production rates for UAN (urea-ammonium nitrate) treatments during 29 d of incubation for SoilBuilder (SB), SoilBuilder filtered (SBF), *Bacillus* plant growth-promoting rhizobacteria mix (BM), and control (no product applied) soil treatments.

While the compositions and methods heretofore are susceptible to various modifications and alternative forms, exemplary embodiments will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Definitions

Where a range of values is provided, it is understood that each intervening value, to the tenth of the unit of the lower limit unless the context clearly dictates otherwise, between the upper and lower limit of that range and any other stated or intervening value in that stated range, is included therein. Smaller ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

It must be noted that as used herein and in the appended claims, the singular forms "a," "and," and "the" include plural references unless the context clearly dictates otherwise.

As defined herein, "derived from" means directly isolated or obtained from a particular source or alternatively having identifying characteristics of a substance or organism isolated or obtained from a particular source.

As defined herein "modulate" means adjusting amount and/or rate of nitrous oxide emission.

Abbreviations

BM: *Bacillus* mixture;
DAI: days of incubation
PGPR: plant growth promoting rhizobacteria
SB: SoilBuilder™ (Agricen)
SBF: SoilBBuilder™ (Agricen) filtered
UAN: urea ammonium nitrate
CAN: calcium ammonium nitrate Description of Specific Embodiments As noted above, provided is a method for modulating nitrous oxide emission from a substrate for growing one or more plants treated with a fertilizer blend comprising ammonium nitrate comprising applying to said substrate a Trichoderma-free microbial based soil additive comprising a mixture of at least four microbial strains or extract, in an amount effective to modulate said nitrous oxide emission. The microbial based soil additive may be applied to the substrate either prior to, simultaneously with, subsequent to, or in any combination of the previous when applying the fertilizer blend to said substrate. The microbial based soil additive comprises in one embodiment, between about $1 \times 10^3$ to about $5 \times 10^6$ colony forming units per milliliter, based on plate counts using laboratory culture media such as tryptic soy agar, at applications of about 2-18 liters per hectare. For container-grown plants, the application rate may be applied between about 0.4 mL to about 4.0 mL of microbial based soil additive per plant container.

The fertilizer, in another embodiment, is applied at a rate sufficient to provide the substrate for growing one or more plants with a fertilizer concentration level of between about 50 mg of fertilizer per kg of substrate to about 100 mg of fertilizer per kg of substrate. In a particular embodiment, the ratio of microbial based soil additive to fertilizer is about 1.5 L (1.5 kg) to about 7.5 L (7.5 kg) per metric ton of granular fertilizer. In another embodiment, the ratio of microbial based liquid soil additive to liquid fertilizer is from about 1:1 (microbial based additive to undiluted liquid fertilizer) to about 1:50.

The method provided may further comprise adjusting the moisture level of the substrate to allow microbial function and/or plant growth. In a particular embodiment, the moisture level of the substrate for growing one or more plants is adjusted to between about 15% and about 60%. The moisture level may be adjusted by methods known in the art; in a particular embodiment, the moisture is adjusted by adding a moisture source and weighing the jars.

The microbial based soil additive used in these methods may be derived from microbial based material that adds nutrients such as carbon and nitrogen, as well as beneficial bacteria to soil and when applied to soil improve its physical properties, such as water retention, permeability, water infiltration, drainage, aeration and structure. In a particular embodiment, the microbial based soil additive is derived from a mixture of spore-forming plant-growth promoting rhizobacteria (PGPR). In a preferred embodiment, the mixture of the spore-forming plant-growth promoting rhizobacteria comprises an isolate of Bacillus pumilus, an isolate of Bacillus subtilis or Bacillus amyloliquefaciens, an isolate of Bacillus safenis, and an isolate of Lysinibacillus xylanilyticus. In a preferred embodiment, the isolate of Bacillus pumilus is INR-7. In another preferred embodiment, the isolate of Bacillus subtilis or Bacillus amyloliquefaciens is IN937a. In yet another preferred embodiment, the isolate of Bacillus safenis is T4. In even yet another preferred embodiment, the isolate of Lysinibacillus xylanilyticus is SE56.

In yet another particular embodiment, the microbial based soil additive may be derived from a microbial consortium comprising a consortium of microbial (e.g. bacterial) species. In one particular embodiment, the microbial based soil additive comprises Acidovoras facilis, Bacillus licheniformis, Bacillus subtilis, Bacillus oleronius, Bacillus marinus, Bacillus megaterium, Rhodococcus rhodochrous, has a pH between about 8.0 to about 8.5, , and contains Nitrate-N, Boron, Phosphorus, Potassium, Calcium, Magnesium, Zinc, Copper, Iron, Manganese, Sodium.

In another particular embodiment the microbial based soil additive and/or amendment is set forth in PCT/US 2012/060010. This microbial product contains microbes and microbially-produced metabolites. In a particular embodiment, the soil additive and/or amendment has the following characteristics: (a) has a pH of about 7.5 to 8.5; (b) COD range less than about 150 mg/L; (c) Conductivity range of about 600 uS to 1400 uS; (d) Color clear amber between about 500 pt/co units to about 700 pt/co units in a platinum to cobalt (pt/co) scale; (e) comprises Syntrophus, Desulfovibrio, Symbiobacteria, Georgfuschia, Thauera, Nitrosomonas, Bellilinea, Sulfuritalea, and Owenweeksia; (f) has a biomass greater than $10^7$ microbes per ml.; (g) contains between about 10-60 ng/ml DNA; (h) comprises at least eight microbial species.

This microbial consortium may additionally be derived from feedstock processed through a bioreactor. In a more particular embodiment, the microbial based soil additive is derived from either the concentrated or unconcentrated form of SoilBuilder™ (AGRICEN, Pilot Point, Tex.) (SB) and even more particularly from a filter-sterilized broth of SoilBuilder™-AF (AGRICEN, Pilot Point, Tex.) (SBF).

EXAMPLE

The composition and methods set forth above will be further illustrated in the following, non-limiting Examples. The examples are illustrative of various embodiments only and do not limit the claimed invention regarding the materials, conditions, weight ratios, process parameters and the like recited herein.

Study #1-Effect of Microbial Based Soil Additive on Reduction of Nitrous Oxide Emissions In a Closed Plant-Free System (29 Day Study)

$N_2O$ emissions were evaluated from closed, plant-free soil systems in studies conducted at Auburn University, Auburn AL USA. The non-sterile soil (400 g/0.95 L glass jar) was adjusted to 20% moisture and treated with or without SoilBuilder; SoilBuilder filtered free of microbial cells (microbial by-products only); a mixture of four Bacillus species ($1 \times 10^5$ cfu/ml); or an untreated control. All containers received 25 mL of solution containing the appropriate microbial or control treatment. The fertilizer treatments were applied in equal liquid volumes and consisted of urea ammonium nitrate (UAN-32), calcium ammonium nitrate (CAN-17), ammonium nitrate (AN) or urea, with each fertilizer delivering 75 mg N/kg of soil. Soils were incubated and sampled at 1, 2, 8, 15, 22 and 29 days to determine $N_2O$ concentration in the air headspace. $N_2O$ was measured by gas chromatography in air samples removed by a syringe through a needle septum sealed in the lid of each jar. After withdrawing samples, the jars were opened and allowed to equilibrate at room temperature with the ambient atmosphere prior to re-sealing for the next measuring period. The results are shown in Table 1.

TABLE 1

Total nitrous oxide emissions (ppm) Fromm non-sterile soils in jars treated with various nitrogen fertilizers and microbial-based inoculants.

| | Liquid fertilizer applied at 75 mg N/kg soil | | | |
| --- | --- | --- | --- | --- |
| Treatment | Calcium Ammonium Nitrate (CAN-17) | Urea Ammonium Nitrate (UAN-32) | Ammonium Nitrate (AN) | Urea |
| SoilBuilder | 190.99 c | 77.87 c | 140.55 b | 273.34 ab |
| Filtered SoilBuilder (by-products only) | 110.91 c | 212.72 bc | 210.40 a | 187.97 bc |
| Mix of 4 Bacillus sp ($1 \times 10^5$ cfu/mL) | 288.87 b | 336.73 ab | 91.17 c | 349.74 a |
| Control | 584.00 a | 383.87 a | 13.51 d | 167.18 c |

Values within columns not sharing the same letter are significantly different ($P < 0.05$).

The results in Table 1 indicate that SoilBuilder significantly reduced $N_2O$ emissions from soils treated with CAN-17 and UAN-32. Filtered SoilBuilder (microbial by-products only) significantly reduced $N_2O$ emissions from CAN-17 and UAN-32. However, as shown in Table 2. the mixture of four Bacillus species significantly reduced $N_7O$ emissions over the control at one and 2 days after UAN-32 treatment but not, as shown in Table after 29 days of treatment. The mixture of four Bacillus species significantly reduced $N_2O$ emissions over the control in the CAN-17 treatment only after 29 days.

TABLE 2

Emissions of nitrous oxide 1 and 2 days after application of PGPR and with use of urea ammonium nitrate

| Treatment | Day 1 | Day 2 |
| --- | --- | --- |
| PGPR | 0.87 ppm | 2.61 ppm |
| Control | 1.61 ppm | 5.14 ppm |

Study #2: Effect of Microbial Based Soil Additive on Reduction of Nitrous Oxide Emissions (41 Day Study) In a Plant Containing System Nitrous oxide levels of non-sterile soil treated with the SoilBuilder™ product, SoilBuilder™ product filtrate and PGPR bacteria are compared with untreated non-sterile soil. Eighty plastic pots were filled with 6 kg of non-sterile soil each. The moisture level of the non-sterile soil in each pot was adjusted to approximately 60% WHC using a WaterScout SM 100 Soil moisture sensor (Spectrum technology, Inc.)

Each of the pots (20) was then treated with 375 milliliters of a preparation of SoilBuilder™ product that contains 16 milliliters of SoilBuilder™ product in 1.0 liter of water. Other 20 pots were treated with 375 milliliters of a preparation of SoilBuilder™ product extract that contains 16 milliliters of SoilBuilder™ product extract in 1.0 liter of water. Twenty more pots were treated with 375 ml of a preparation of PGPR that contained approximately 1x $10^5$ colony—forming units per milliliter. PGPR is a mixture of four spore-forming *Bacillus* species in equal amounts. The *Bacillus* species tested were INR-7, , IN937a, T4, , and SE56. INR-7 is an isolate of *Bacillus pumilis*. IN937a is an isolate of *Bacillus subtilis*. T4 is an isolate of *Bacillus safenis*. SE56 is an isolate of *Lysinibacillus boronitolerans*. The PGPR were adjusted to a population of approximately 1×$10^5$ colony-forming units per milliliter.

After the application of the three different microbial treatments, each of 20 pots was then treated with one of four different nitrogen fertilizers: urea, urea ammonium nitrate 32% N (UAN), calcium ammonium nitrate 17% N (CAN), and no fertilizer. The fertilizer treatments were applied in equal liquid volumes. Each fertilizer treatment delivered 75 milligrams of nitrogen per kilogram of non-sterile soil. Calcium fertilization was applied as $CaCl_2$ at a rate of 6.6 g/pot (UAN, urea and unfertilized control), and 5.9 g/pot (CAN). Phosphorus and potassium fertilization was applied as $K_2HPO_4$ at a rate of 1.3 g/pot. Two corn seeds were also added per pot.

A control of twenty pots was used. Each control was a plastic pot having 6 kg of non-sterile soil with approximately 60% WHC. Each control pot was treated with one of urea, urea ammonium nitrate 32% N (UAN), calcium ammonium nitrate 17% N (CAN), and no fertilizer. However, none of the control pots were treated with the SoilBuilder product, SoilBuilder™ product extract or PGPR. All pots were maintained for a period of 41 days at 27° C.

At days 1, 3, 6, 10, 15, 21, 27 and 34, , pots were placed inside a static closed chamber and the air inside the chamber was sampled at: 0, 20, , and 40 minutes after the chamber was closed to determine the nitrous oxide flux. At each time interval, gas samples (10 mL) were collected with polypropylene syringes and injected into evacuated glass vials (6 mL) fitted with butyl rubber stoppers. After the 41 days of evaluation, the levels of nitrous oxide for each type of fertilizer were averaged and recorded. The nitrous oxide level of each sample was measured by gas chromatography as known in the art.

Results

Results are shown in Tables 3 and 4. The SoilBuilder™ product treatment significantly reduced total nitrous oxide production over the 41-day period of the test from samples fertilized with calcium ammonium nitrate and urea ammonium nitrate, when compared to the control. For example, emissions of nitrous oxide were reduced by 15% in samples treated with calcium ammonium nitrate compared to the control. Further, emissions of nitrous oxide were reduced by 33% in samples treated with urea ammonium nitrate compared to the control.

The SoilBuilder™ product extract treatment significantly reduced total nitrous oxide production over the 41-day period of the test from samples fertilized with calcium ammonium nitrate and urea ammonium nitrate, when compared to the control. For example, emissions of nitrous oxide were reduced by 28% in samples treated with calcium ammonium nitrate compared to the control. Further, emissions of nitrous oxide were reduced by 35% in samples treated with urea ammonium nitrate compared to the control.

The PGPR treatment significantly reduced total nitrous oxide production in plant treated soil over the 41-day period of the test from samples fertilized with calcium ammonium nitrate and urea ammonium nitrate, when compared to the control. For example, emissions of nitrous oxide were reduced by 41% in samples treated with calcium ammonium nitrate compared to the control. Further, emissions of nitrous oxide were reduced by 49% in samples treated with urea ammonium nitrate compared to the control.

TABLE 3

Total $N_2O$ production after 41 days after treatment

| Treatments | Fertilizer treatments | | | |
|---|---|---|---|---|
| | CAN-17 | un-fertilized control | UAN-32 | urea |
| PGPR | 1216.41 d | 309.75 b | 1166.74 b | 1161.42 a |
| Soil Builder | 1759.14 b | 317.78 b | 1519.08 b | 1534.59 a |
| Soil Builder extract | 1480.04 c | 318.91 b | 1490.01 b | 1625.66 a |
| Control | 2063.37 a | 428.21 a | 2299.79 a | 1322.88 a |

TABLE 4

Fluxes of $N_2O$ during 41 days

| | | μg $N_2O$—N/day kg of dry soil Days after treatment | | | | | | | | |
|---|---|---|---|---|---|---|---|---|---|---|
| Fertilizer | Treatment | 1 | 3 | 6 | 10 | 15 | 21 | 27 | 34 | 41 |
| Urea | PGPR | 168.16 | 64.13 | 27.78 | 21.79 | 65.95 | 14.29 | 4.53 | 9.30 | 2.64 |
| Urea | Soil Builder | 58.14 | 60.47 | 113.22 | 28.93 | 70.56 | 25.69 | 13.79 | 16.86 | 4.98 |
| Urea | Soil Builder extract | 81.89 | 111.15 | 104.58 | 53.07 | 71.20 | 14.05 | 2.94 | 12.25 | 9.81 |
| Urea | Control | 108.43 | 66.76 | 73.86 | 34.99 | 27.34 | 31.37 | 10.34 | 22.94 | 2.75 |
| UAN-32 | PGPR | 134.63 | 103.48 | 102.30 | 19.34 | 24.26 | 11.72 | 2.27 | 2.76 | 5.80 |
| UAN-32 | Soil Builder | 83.51 | 46.99 | 86.49 | 68.01 | 59.16 | 36.64 | 6.84 | 9.41 | 3.01 |
| UAN-32 | Soil Builder extract | 50.46 | 77.56 | 117.75 | 46.21 | 70.20 | 22.99 | 5.47 | 2.47 | 5.88 |
| UAN-32 | Control | 338.42 | 143.26 | 105.91 | 39.24 | 88.39 | 50.79 | 3.74 | 5.86 | 7.64 |
| CAN-17 | PGPR | 90.32 | 71.16 | 87.24 | 25.15 | 68.19 | 9.52 | 3.03 | 3.11 | 2.72 |
| CAN-17 | Soil Builder | 116.04 | 91.53 | 170.80 | 65.13 | 56.00 | 11.66 | 4.29 | 3.03 | 9.58 |

TABLE 4-continued

Fluxes of N₂O during 41 days

| | | μg N₂O—N/day kg of dry soil Days after treatment | | | | | | | | |
|---|---|---|---|---|---|---|---|---|---|---|
| Fertilizer | Treatment | 1 | 3 | 6 | 10 | 15 | 21 | 27 | 34 | 41 |
| CAN-17 | Soil Builder extract | 88.87 | 98.83 | 119.12 | 54.08 | 55.98 | 8.01 | 5.48 | 2.82 | 7.02 |
| CAN-17 | Control | 290.54 | 125.49 | 94.68 | 70.12 | 89.10 | 15.02 | 6.13 | 4.14 | 4.48 |
| Control | PGPR | 46.36 | 17.94 | 24.37 | 8.12 | 6.88 | 2.13 | 1.14 | 0.92 | 2.28 |
| Control | Soil Builder | 38.10 | 20.55 | 22.17 | 6.74 | 9.14 | 2.33 | 1.35 | 1.55 | 4.35 |
| Control | Soil Builder extract | 49.39 | 16.83 | 20.02 | 8.77 | 6.05 | 3.74 | 1.56 | 2.32 | 2.78 |
| Control | Control | 61.20 | 32.78 | 33.05 | 11.02 | 6.48 | 3.50 | 1.09 | 2.49 | 2.01 |

Study #3 Effect of Microbial-Based Inoculants on Nitrous Oxide Emissions from an Incubated Soil Medium Containing Urea Fertilizers Materials and Methods
Soil Characterization An initial soil analysis was performed by the Auburn University Soil Testing Laboratory as described by Hue and Evans (1986). Briefly, total C and N were analyzed using an Elementar Vario Macro C-N analyzer (Elementar Americas). The soil pH was determined on 1:1 soil/water suspensions with a glass electrode meter. Concentrations of P, K, Mg, and Ca were determined using Mehlich I (double acid extracting solution) (Olsen and Sommers, 1982) and measured using an ICAP 9000 spectrometer (Thermo Jarrell Ash). The cation exchange capacity (CEC) was determined by base summation (Ca, Mg, K, and Na) according to the procedures of Hue and Evans (1986).
Soil Microcosms A soil—sand mixture was used as the medium for this study. Sand was mixed with the soil to improve water infiltration and minimize anaerobic conditions during the study. Briefly, a sandy loam soil with a texture of 72.8% sand, 10.4% clay, and 16.8% silt was mixed 3:1 (v/v soil/sand) with white brick or mason sand (particle size: ⅛-¼ mm). The mixture resulted in a soil medium with the texture of a loamy sand (78.8% sand, 4.4% clay, and 16.8% silt). The soil—sand mixture had a pH of 6.14, , CEC of 1.13 cmol kg$^{-1}$, total N concentration of 0.7 g kg$^{-1}$, organic matter concentration of 17 g kg$^{-1}$, total C concentration of 2.6 g kg$^{-1}$, $NO_3$ concentration of 10.53 mg kg$^{-1}$, $NH_4$ concentration of 0.73 mg kg$^{-1}$, Mg concentration of 236 mg kg$^{-1}$, Ca concentration of 305 mg kg$^{-1}$, P concentration of 4 mg kg$^{-1}$, and K concentration of 51 mg kg$^{-1}$.

Soils were incubated for flux measurements in 2-L glass jars containing 400 g of the dry soil—sand mixture with a soil bulk density of 1.15 g cm$^{-3}$. The soil—sand mixture was then adjusted to 20% moisture (gravimetric water content) with the addition of the treatments, which were organized in a complete randomized design with a 4×3 factorial arrangement with three microbial-based treatments and a water control (no microbial-based treatment) and two N fertilizer sources and an unfertilized control, each replicated four times. The N fertilizer treatments included (i) UAN-32% and (ii) urea.

Nitrogen fertilization was calculated based on 168 kg ha$^{-1}$. The amount of N applied was calculated based on 1 ha furrow slice (15-cm topsoil), which is equal to 1.98 Gg of soil. Based on this calculation, each jar (400 g of dry soil) received 0.03 g of N in the fertilizer treatments. The specific amount of fertilizer added was 0.0937 mL of UAN solution and 0.065 g of urea. The experiment was designed to provide the same amount of N regardless of the fertilizer source. Therefore, the quantity of N fertilizer added in each treatment was adjusted for each fertilizer type so that all treatments received the same amount of N.
Microbial Source Preparation SoilBuilder, a commercially available microbial soil amendment, is prepared from a bioreactor system consisting of a continuously maintained microbial community. The final product contains bacteria and bacterial metabolites derived from the bioreactor. Based on plate counts using tryptic soy agar (TSA) (incubation for 24 h at 25° C.), the most commonly occurring bacteria within the final stabilized product are *Acidovorax facilis, Biacillus licheniformis, Bacillus subtilis, Bacillus oleronius, Bacillus marinus, Bacillus megaterium*, and *Rhodococcus rhodochrous*, each at 10 colony-forming units (cfu) m$^{-3}$.

SoilBuilder filtered (SBF) consisted of SoilBuilder (SB) without microbial cells and was prepared by filtering SB through a 0.45-μm filter and then through a 0.22-μm filter. The SBF contained microbial metabolites derived from the bioreactor production system that, in addition to other components, included organic acids, peptides, and enzymes.

The PGPR *Bacillus* mixture (BM) included four *Bacillus* strains: *Bacillus safensis* T4 (previously called *B. pumilus* T4), *Bacillus pumilus* INR7, *Bacillus subtilis* ssp. *subtilis* IN937a (previously called *B. amyloliquefaciens* IN937a), and *Lysinibacillus xylanilyticus* SE56 (previously called *Bacillus sphaericus* SE56). These strains were obtained from culture collections at the Department of Entomology and Plant Pathology, Auburn University. These strains have been shown to have an important plant growth-promoting effect (Enebak et al., 1998; Jetiyanon et al., 2003; Kokalis-Burelle et al., 2002, 2003).

The microbial-based treatments were applied at a rate of 25 mL jar$^{-1}$. For the BM treatment, the bacterial mix was prepared by mixing each strain's spore suspension, which was previously quantified by plating the spore mix suspension on TSA and incubating for 48 h at 25° C. The spore mix was then adjusted to a concentration of 100 cfu L$^{-1}$. The final concentration in each jar was of 6.2×10³ cfu per g of dry soil. The SB solution was prepared according to the label instructions by mixing 16 mL of SB in 1.0 L of distilled water immediately before setting up the experiment. The SB contained 10³ cfu L$^{-1}$, so the final concentration in each jar was 10³ cfu per g of dry soil. The SBF treatment was prepared in the same way as the SB treatment but before applying the 25 mL to the incubated sample, the solution was filtered. Sterility of the filtrate was confirmed by plating onto TSA (48 h at 25° C. incubation) and observing no bacterial growth. Unfiltered SB population concentrations were confirmed also by plate count on TSA after incubation for 48 h at 25° C.

Incubation Methods

The fertilizer source corresponding to each N fertilizer treatment was added, followed by the appropriate microbial-based treatment. Four jars without soil, maintained the same way as the jars with the soil—sand mix, served as a blank. A 118-mL plastic container containing 10 mL of water was placed in each jar to maintain humidity. The soil moisture content of the incubating samples was maintained by weighing the experimental units on each sampling day and adding deionized water as necessary. Shortly following treatment application, the incubation jars were sealed hermetically (jars remained sealed between sampling intervals) with retrofitted lids containing butyl rubber stoppers to allow gas ($CO_2$, $CH_4$, and $N_2O$) sampling. The jars were incubated in the dark at 25° C. for 29 d. At the same time, a separate set of jars with the same treatments was incubated simultaneously for destructive sampling to measure soil $NH_4$—N and $NO_3$—N contents. On each sampling day, shortly following gas analysis, the lids of these jars were removed for 5 min to prevent anaerobic conditions from occurring and to allow gases to equilibrate with the ambient atmosphere.

Gas Flux and Soil Ammonium and Nitrate Sampling

Gas samples were collected at 1, 2, 4, 8, 10, 15, 22, , and 29 d after treatment. Soil $NH_4$—N and $NO_3$—N concentrations were determined at 1, 4, 8, 15, 22, , and 29 d after treatment (samples were taken from a second set of jars and not from the jars used for gas sampling). Samples for gas analysis, collected by inserting a 23-gauge needle attached to a gastight 10-mL polypropylene syringe through the rubber septum embedded in the lids of the incubation jars, were injected into evacuated 6-mL glass vials fitted with butyl rubber stoppers. The samples were stored at 25° C. until analysis, which was done within 2 wk of collection. Gas samples were analyzed using a gas chromatograph (Shimadzu GC-14B) equipped with an electron capture detector for $N_2O$. The gas chromatograph's detectors were calibrated by comparison with a standard curve using standards obtained from Scott Specialty Gases. Soil flux was determined by dividing the gas concentration ($CO_2$, $CH_4$, or $N_2O$) by the number of days of incubation between samplings. The gas concentrations observed on each sampling day were added together to determine the total flux for the 29-d incubation.

Soil $NH_4$—N and $NO_3$—N concentrations were determined by extracting 5 g of wet soil with 50 mL of 2 mol $L^{-1}$ KCl for determination of the inorganic N content as described by Keeney and Nelson (1982). Soil extracts were measured colorimetrically for $NH_4$ and $NO_2+NO_3$ using a Bran+Luebbe Auto Analyzer 3.

Statistical Analysis

Analysis of variance, using a general linear model, was used to analyze each response variable for fertilizer type. Pearson correlations were also used to identify relationships among variables ($N_2O$). All statistical analyses were performed using SAS software version 9.2 (SAS Institute, 2004) and a significance level of $\alpha=0.05$ set a priori. An LSD test was used to identify significant differences among treatments (SB, SBF, BM, and control).

Results

Nitrous Oxide Emissions

Urea- and UAN-fertilized soils released 10 times more total $N_2O$ (after 29 d of incubation [DAI]) than the unfertilized treatment (Table 5). These observations confirm reports that as more N cycles through the soil system, a greater quantity of N is converted into $N_2O$ gas (Smith et al., 1997). Previous reports from field studies have indicated that fertilizer-derived $N_2O$ emissions from plots treated with nitrifiable forms of N fertilizer ($NH_3$ or $NH_4$) are greater than those from plots receiving an equivalent application of N as $NO_3$ (Breitenbeck and Bremner, 1986). In this case, UAN had more $NH_4$—N (7.75%) at the beginning of the experiment than the urea (0% $NH_4$—N). When comparing the control treatments (no microbial-based treatment) of UAN and urea (Table 5), total $N_2O$ emissions from UAN were twice the urea treatment.

TABLE 5

Total $N_2O$ production after 29 d of incubation, calculated on a dry-soil basis.

| | | Total production | | |
|---|---|---|---|---|
| Gas | Microbial treatment | Urea | Urea-$NH_4NO_3$ | Unfertilized |
| | | μg N or C $kg^{-1}$ soil | | |
| $N_2O$ | SoilBuilder | 1,322.2 ab† | 376.7 c | 194.9 a |
| | SoilBuilder filtered | 909.2 bc | 1,029.1 bc | 14.1 b |
| | *Bacillus* mixture | 1,691.8 a | 1,628.8 ab | 155.2 a |
| | control | 808.7 c | 1,639.2 a | 181.8 a |

†Means within a column followed by the same letter are not significantly different at the 0.05 level using LSD values.

Figure 2:
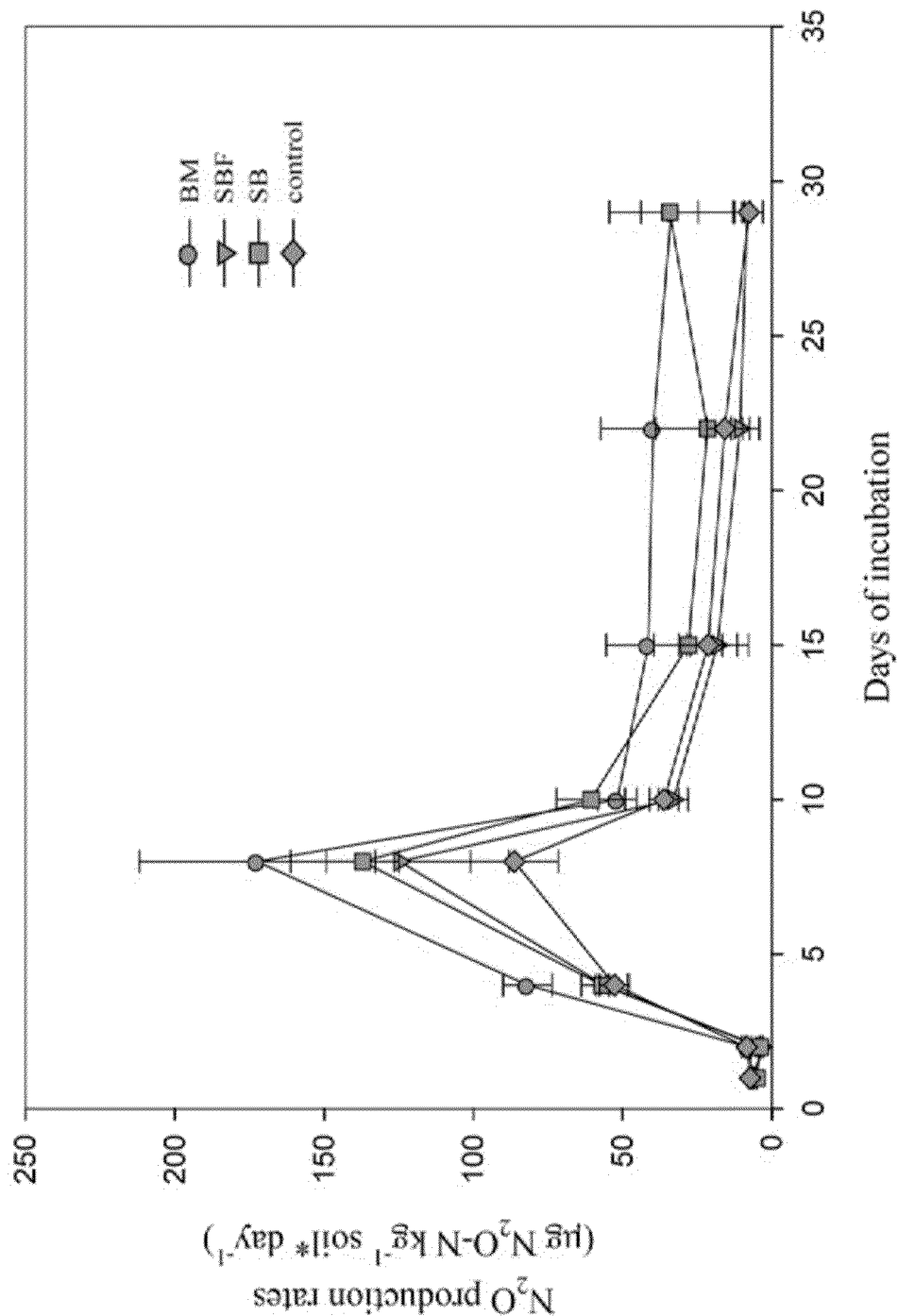
FIG. 2. Temporal changes in $N_2O$ and $CO_2$ production rates for urea fertilizer treatments during 29 d of incubation for SoilBuilder (SB), SoilBuilder filtered (SBF), *Bacillus* plant growth-promoting rhizobacteria mix (BM), and control (no product applied) soil treatments.

Nitrous oxide emissions per sampling day peaked on 8 DAI for all microbial-based treatments (SB, SBF, and BM) that received UAN or urea (FIGS. 1 and 2). High $N_2O$ emissions measured on the first day after applying N fertilizer were also reported by Pathak et al. (2006), who suggested that higher emissions were due to $N_2O$ formation during nitrification of $NH_4$ produced by hydrolysis of the applied urea. A peak was also observed in all treatments following the addition of N as urea, followed by a decline (Bremner and Blackmer, 1978; Fujinuma et al., 2011; Hou et al., 2000). This peak was not observed in the unfertilized treatment (FIG. 3), suggesting that N fertilizer was responsible for the $N_2O$ peak.

Figure 3:
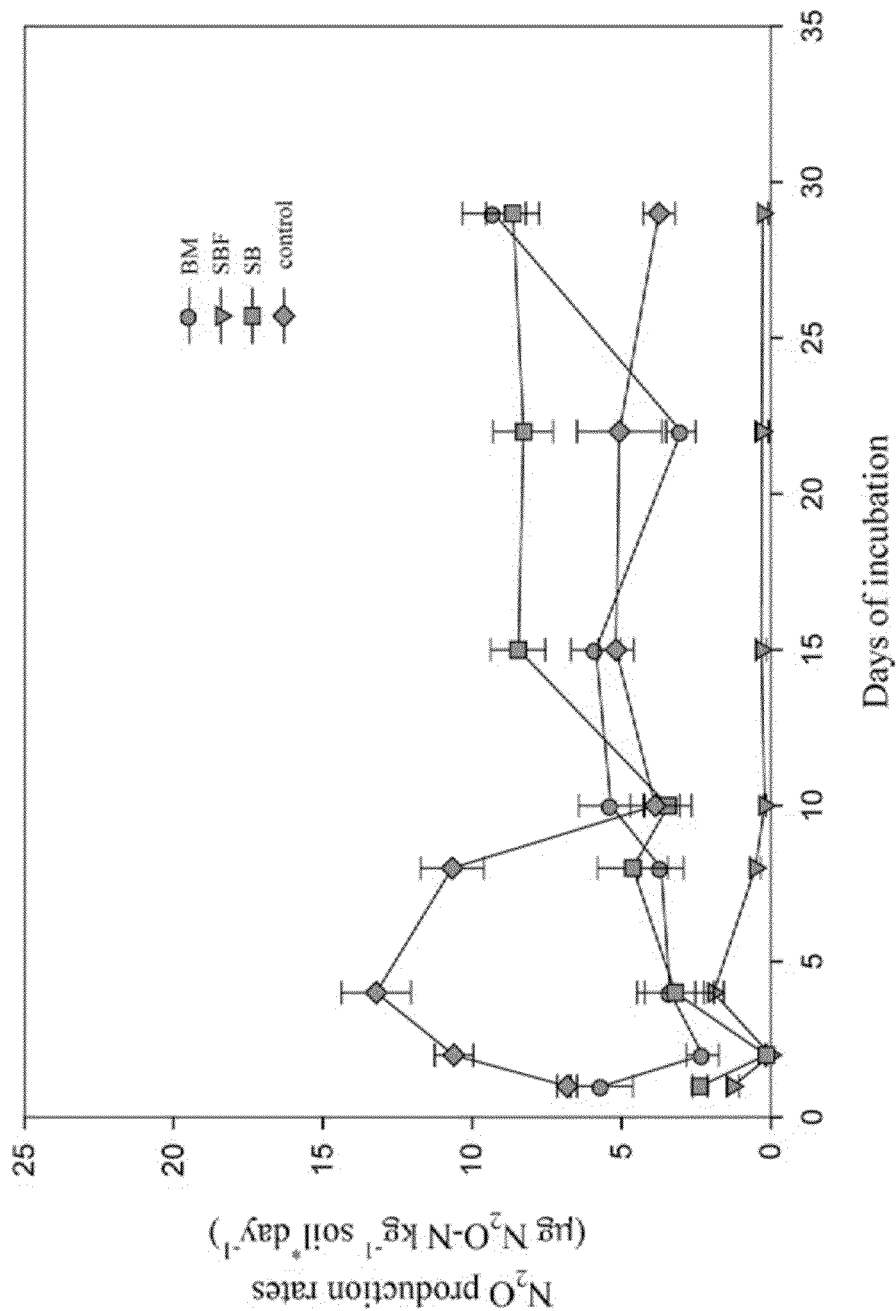
FIG. 3. Temporal changes in $N_2O$ and $CO_2$ production rates for unfertilized treatments during 29 d of incubation for Soil-Builder (SB), SoilBuilder filtered (SBF), *Bacillus* plant growth-promoting rhizobacteria mix (BM), and control (no product applied) soil treatments.

Nitrous oxide production rates between microbial-based treatments varied among different days of the incubation (FIG. 1-3). In the unfertilized treatment (FIG. 3), $N_2O$ production rates were significantly lower for all three microbial-based treatments (SB, SBF, and BM) during the first 8 DAI. After this time, $N_2O$ production from the SB and BM treatments was significantly higher than the control (FIG. 3), while with SBF, emissions stayed lower than the control throughout the experiment.

In UAN-fertilized soils (FIG. 1), the BM treatment resulted in lower rates of $N_2O$ during the first 2 DAI compared with the control (no microbial-based treatment). The SBF treatment also showed a similar pattern, but in this case, differences from the control lasted until 4 DAI. The SB treatment produced significantly less $N_2O$ than the control during the first 22 DAI. The SB and SBF treatments significantly reduced the total $N_2O$ production compared with the control treatment (no microbial-based treatment) (Table 5). With these two treatments, $N_2O$ production was almost five times lower than that observed with the control. The SB and SBF treatments also have in common the presence of microbial metabolites, which could be responsible for the $N_2O$ reduction. The SB treatment, which contained both the living microorganisms and microbial metabolites, resulted in the greatest $N_2O$ reduction.

For urea-treated soils (FIG. 2), there were no significant differences in $N_2O$ production among the control and SB, SBF, or BM for the first 10 DAI. After 10 DAI, the BM treatment increased $N_2O$ production compared with the control. The total $N_2O$ production after 29 d (Table 5) showed that the highest $N_2O$ emissions were recorded with BM and SB treatments, which were significantly higher than the control treatment. The trends observed with urea fertilizer were different from those observed with UAN, even though both fertilizers contain urea. The amount of urea in UAN is only 16.5%; thus, the mechanisms involved in $N_2O$ production appear to be different.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

Various references are cited throughout this specification, each of which is incorporated herein by reference in its entirety.

What is claimed is:

1. A method for reducing nitrous oxide emission from a soil composition comprising:
   a) applying a fertilizer composition to the soil composition, wherein the fertilizer composition comprises calcium ammonium nitrate, urea ammonium nitrate or urea;
   b) applying a *Trichoderma*-free microbial based soil additive to the soil composition in an amount effective to reduce nitrous oxide emission;
   c) measuring the amount of nitrous oxide in the soil composition—fertilizer composition-soil additive combination; and
   d) determining that said nitrous oxide emission has been reduced when compared to a control soil-fertilizer composition that has not been treated with the *Trichoderma*-free microbial based soil additive.

2. The method according to Claim 1 wherein said soil composition is agricultural soil or non-sterile soil in pots.

3. The method according to claim 1, wherein said soil composition is soil, vermiculite, pearlite, gravel, clay, sand, peat moss, ground up wood, or pine bark.

4. The method according to claim 1, wherein said microbial based soil additive comprises a mixture of spore-forming plant-growth promoting rhizobacteria comprising an isolate of *Bacillus pumilus*, an isolate of *Bacillus subtilis*, an isolate of *Bacillus safenis*, and an isolate of *Lysinibacillus xylanilyticus*.

5. The method according to claim 1 wherein said microbial based soil additive comprises *Bacillus licheniformis, Bacillus subtilis, Bacillus megaterium* and *Rhodococcus rhodochrous* and has a pH between about 8.0 to about 8.5.

6. The method according to claim 1, wherein said method further comprises adjusting the moisture level of the soil composition.

7. The method according to claim 1, wherein the ratio of microbial based liquid soil additive to fertilizer is about 1.5 L (1.5 kg) to about 7.5 L (7.5 kg) per metric ton of granular fertilizer.

8. The method according to claim 1, wherein the microbial based soil additive and the fertilizer composition are in liquid form, and the ratio of microbial based liquid soil additive to liquid fertilizer composition is from about 1:1 to about 1:50 microbial based additive:undiluted liquid fertilizer composition.

9. The method according to claim 1, wherein the microbial based soil additive comprises between about $1 \times 10^3$ to about $5 \times 10^6$ colony forming units per milliliter.

10. The method according to claim 1, wherein the fertilizer is applied at a rate sufficient to provide adequate nitrogen nutrition for growing one or more plants with a fertilizer concentration level of between about 50 mg of fertilizer per kg of soil composition to about 100 mg of fertilizer per kg of soil composition.

* * * * *